(12) United States Patent
Miyanaga

(10) Patent No.: US 12,397,473 B2
(45) Date of Patent: Aug. 26, 2025

(54) BORING DEVICE

(71) Applicant: KABUSHIKI KAISHA MIYANAGA, Miki (JP)

(72) Inventor: Masaaki Miyanaga, Miki (JP)

(*) Notice: Subject to any disclaimer, the term of this patent is extended or adjusted under 35 U.S.C. 154(b) by 628 days.

(21) Appl. No.: 17/905,477

(22) PCT Filed: Feb. 22, 2021

(86) PCT No.: PCT/JP2021/006611
§ 371 (c)(1),
(2) Date: Sep. 1, 2022

(87) PCT Pub. No.: WO2021/199791
PCT Pub. Date: Oct. 7, 2021

(65) Prior Publication Data
US 2023/0118075 A1    Apr. 20, 2023

(30) Foreign Application Priority Data

Mar. 31, 2020  (JP) .................................. 2020-062957
Sep. 9, 2020   (JP) .................................. 2020-151051

(51) Int. Cl.
*B28D 7/02*      (2006.01)
*B28D 1/14*      (2006.01)
*F04B 43/12*     (2006.01)

(52) U.S. Cl.
CPC ................ *B28D 7/02* (2013.01); *B28D 1/14* (2013.01); *F04B 43/1253* (2013.01)

(58) Field of Classification Search
CPC ......... B28D 7/02; B28D 1/14; F04B 43/1253; F16H 1/16
See application file for complete search history.

(56) References Cited

U.S. PATENT DOCUMENTS

| | | | |
|---|---|---|---|
| 2002/0045415 A1* | 4/2002 | Bath | B28D 7/02 451/449 |
| 2015/0165583 A1* | 6/2015 | Fujita | B24B 5/40 451/465 |
| 2017/0036373 A1* | 2/2017 | Fujita | B24B 33/088 |
| 2017/0044756 A1* | 2/2017 | Fujita | F16B 13/08 |
| 2017/0136654 A1* | 5/2017 | Fujita | B28D 1/14 |

FOREIGN PATENT DOCUMENTS

| | | |
|---|---|---|
| JP | H04217411 A | 8/1992 |
| JP | 2002337136 A | 11/2002 |
| JP | 2007313855 A | 12/2007 |
| JP | 2017196846 A | 11/2017 |
| JP | 2019107754 A | 7/2019 |
| KR | 100990817 B1 | 10/2010 |

\* cited by examiner

*Primary Examiner* — Nathaniel C Chukwurah
(74) *Attorney, Agent, or Firm* — Alleman Hall & Tuttle LLP

(57) ABSTRACT

A boring device according to one embodiment of the present invention includes: a cutting edge; a drive unit that rotationally drives the cutting edge; a feed flow path through which a cooling liquid is fed to the cutting edge; and a tube pump that forces the cooling liquid in the feed flow path to flow to the cutting edge. The tube pump includes a feed tube constituting a part of the feed flow path and a first pressing mechanism that presses the feed tube, and the first pressing mechanism is driven by the drive unit.

12 Claims, 12 Drawing Sheets

BORING DEVICE

TECHNICAL FIELD

The present invention relates to boring devices.

BACKGROUND ART

For example, a boring device as proposed in Patent Literature 1 is conventionally known.

The boring device of Patent Literature 1 includes a drill bit and an electric drill that rotates the drill bit. The boring device of Patent Literature 1 further includes: a cooling liquid feed attachment disposed between the drill bit and the electric drill to feed a cooling liquid to a cutting edge of the drill bit; and a cooling liquid tank that holds the cooling liquid. The cooling liquid tank is provided with a pump, by which the cooling liquid held in the cooling liquid tank is forced to flow to the cooling liquid feed attachment through a feed flow path.

CITATION LIST

Patent Literature

PTL 1: Japanese Laid-Open Patent Application Publication No. 2007-313855

SUMMARY OF INVENTION

Technical Problem

The configuration of the boring device of Patent Literature 1 is complicated because the cooling liquid tank is provided with the pump that forces the cooling liquid to flow to the cutting edge of the drill bit.

It is therefore an object of the present invention to provide a boring device capable of forcing a cooling liquid to flow to a cutting edge with a simple device configuration.

Solution to Problem

In order to solve the problem described above, a boring device according to the present invention includes: a cutting edge; a drive unit that rotationally drives the cutting edge; a feed flow path through which a cooling liquid is fed to the cutting edge; and a tube pump that forces the cooling liquid in the feed flow path to flow to the cutting edge, wherein the tube pump includes a feed tube constituting a part of the feed flow path and a first pressing mechanism that presses the feed tube, and the first pressing mechanism is driven by the drive unit.

With the above features, the tube pump is driven by the drive unit that rotationally drives the cutting edge. Thus, the cooling liquid can be forced to flow to the cutting edge with a simple device configuration.

Advantageous Effects of Invention

The present invention can provide a boring device capable of forcing a cooling liquid to flow to a cutting edge with a simple device configuration.

BRIEF DESCRIPTION OF DRAWINGS

FIG. 12A is a schematic view of the shield as viewed from the proximal end of a drill bit, and FIG. 12B is a cross-sectional view of the shield cut at the center in the width direction of the boring device along the longitudinal direction of the boring device.

FIG. 14A is a cross-sectional view of the cooling liquid feed mechanism and its neighboring components in a state with the feed flow path closed before a boring operation, and FIG. 14B is a cross-sectional view of the cooling liquid feed mechanism and its neighboring components in a state with the feed flow path open during the boring operation.

DESCRIPTION OF EMBODIMENTS

Hereinafter, boring devices according to exemplary embodiments of the present invention will be described with reference to the drawings. The present invention is not limited by the described embodiments. In the following description, the same or like elements are denoted by the same reference signs throughout the drawings and will not be described repeatedly.

First Embodiment

Figure 1:
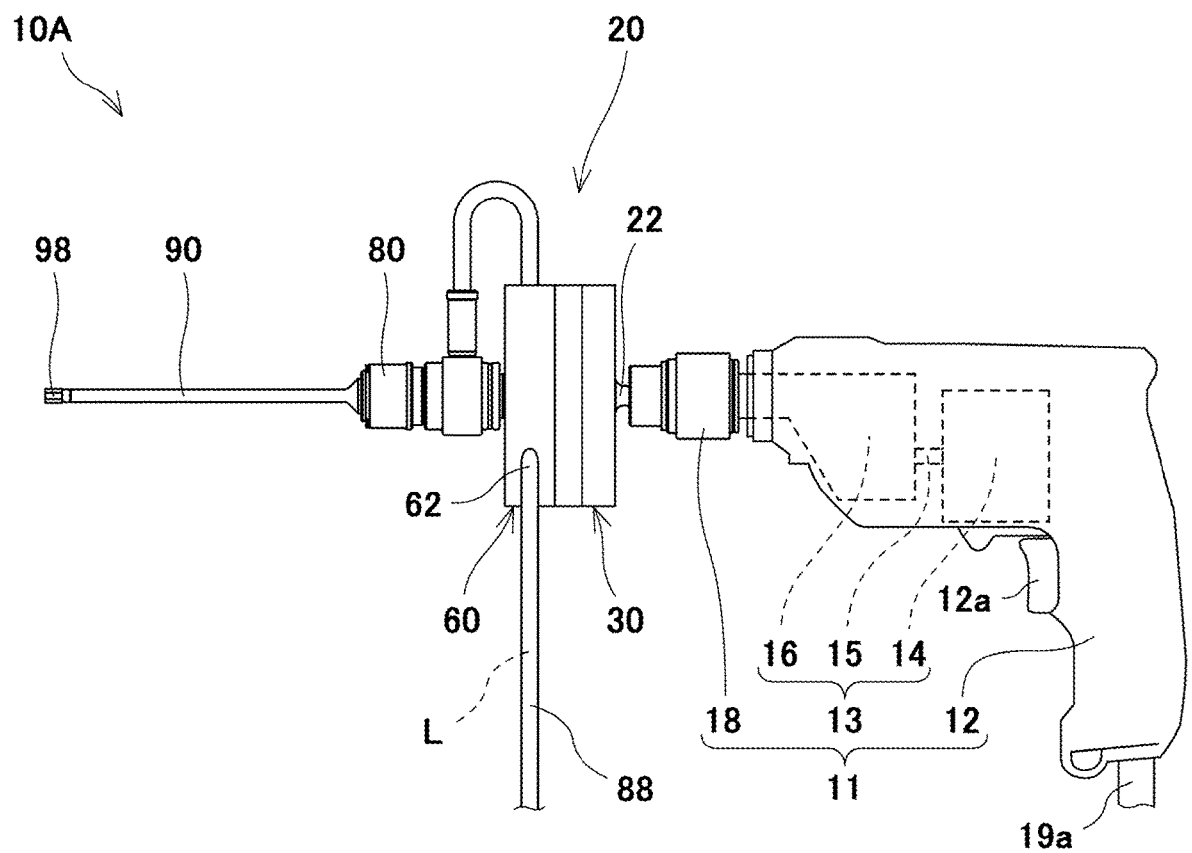
FIG. 1 is a schematic view showing the overall configuration of a boring device according to a first embodiment of the present invention.

FIG. 1 is a schematic view showing the overall configuration of a boring device according to a first embodiment. As shown in FIG. 1, the boring device 10A according to the present embodiment includes an electric drill 11, a pump unit 20 attached to the electric drill 11, and a drill bit 90 attached to the electric drill 11 via the pump unit 20. The boring device 10A further includes a feed flow path 88 through which a cooling liquid L is fed to a cutting edge 98 of the drill bit 90.

In the present embodiment, the drill bit 90 is rotationally driven by the electric drill 11, and the cutting edge 98 of the rotating drill bit 90 is pressed against a workpiece such as a concrete or stone material (not shown) to perform a boring operation. During such a boring operation, the cooling liquid L in the feed flow path 88 is forced by the pump unit 20 to flow to the cutting edge 98 of the drill bit 90 for purposes such as reducing the heat generation of the drill bit 90 and the workpiece.

The drill bit 90 is hollow. Thus, the cooling liquid L flows through the interior of the drill bit 90 and is fed to the cutting edge 98 of the drill bit 90. The cooling liquid L fed to the cutting edge 98 of the drill bit 90 is discharged out of the cutting edge 98 to reduce the heat generation of the drill bit 90 and the workpiece. The cooling liquid L mixes with chips of the workpiece to form a suspension, which is discharged outside.

A cooling liquid tank (not shown) that holds the cooling liquid L may be disposed at the proximal end of the feed flow path 88. The cooling liquid L is typically water and may be, for example, another liquid having a low viscosity. For example, when the workpiece is an iron plate, an oil having a low viscosity may be used as the cooling liquid L.

Electric Drill 11

The electric drill 11 includes a housing 12, a drive unit 13 enclosed in the housing 12 to rotationally drive the drill bit 90, and a first gripping mechanism 18 disposed outside the housing 12 to grip a shank 22 projecting from the proximal end surface of the pump unit 20.

The drive unit 13 includes an electric motor 14 and a motor speed reduction mechanism 16 attached to a drive shaft 15 of the electric motor 14 to reduce the speed of rotation produced by power derived from the electric motor 14 and transmit the resulting power to the shank 22.

Pump Unit 20

Figure 2:
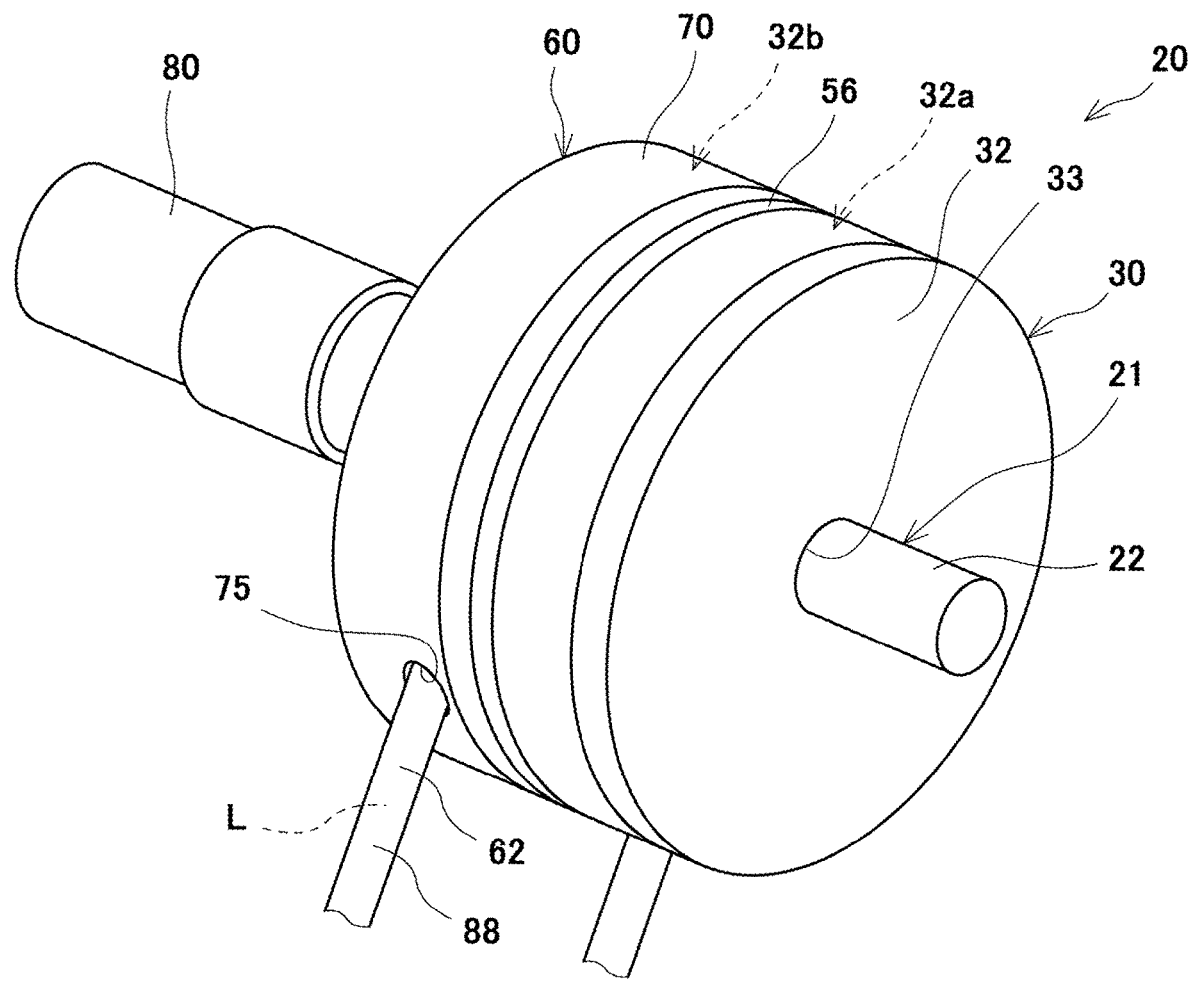
FIG. 2 is a perspective view of a pump unit of the boring device according to the first embodiment of the present invention and shows the pump unit as viewed from a drive unit.

FIG. 2 is a perspective view of the pump unit of the boring device according to the present embodiment and shows the pump unit as viewed from the drive unit. As shown in FIG. 2, the pump unit 20 includes a tube pump 60 that forces the cooling liquid L in the feed flow path 88 to flow to the cutting edge 98 of the drill bit 90 and a speed reduction mechanism 30 disposed between the drive unit 13 and the tube pump 60 (or a first pressing mechanism 64 described later) to reduce the speed of rotation produced by power derived from the drive unit 13 and transmit the resulting power to the tube pump 60 (or the first pressing mechanism 64).

The pump unit 20 further includes an input shaft 21 through which the power derived from the drive unit 13 is input to the speed reduction mechanism 16. The input shaft 21 extends from the drive unit 13 and penetrates the pump unit 20 toward the cutting edge 98. The pump unit 20 further includes a second gripping mechanism 80 disposed at the distal end of the input shaft 21 to grip a proximal end portion of the drill bit 90. The input shaft 21 is connected to the drill bit 90 via the second gripping mechanism 80 and rotates together with the drill bit 90. The proximal end portion of the input shaft 21 is the shank 22 described above.

Speed Reduction Mechanism 30

The speed reduction mechanism 30 includes two planetary gear mechanisms 31a and 31b aligned in the axial direction of the input shaft 21. The planetary gear mechanism 31a is located toward the drive unit 13 (this planetary gear mechanism 31a corresponds to "planetary gear mechanism closest to the drive unit among the plurality of planetary gear mechanisms" or "one of the adjacent planetary gear mechanisms that is closer to the drive unit"). The planetary gear mechanism 31b is located toward the drill bit 90 (this planetary gear mechanism 31b corresponds to "planetary gear mechanism closest to the cutting edge among the plurality of planetary gear mechanisms" or "the other of the adjacent planetary gear mechanisms that is closer to the cutting edge).

Figure 3:
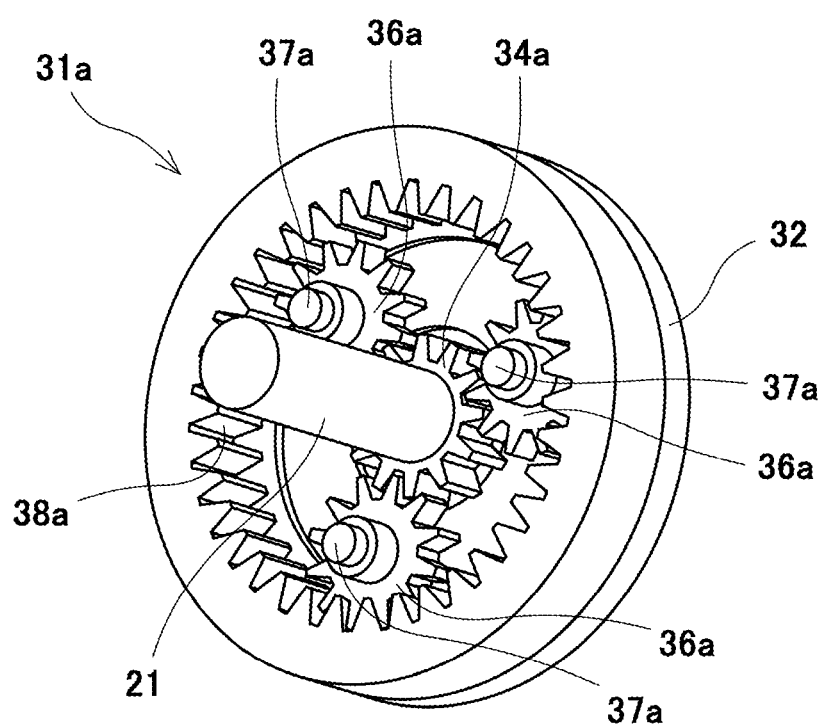
FIG. 3 is a perspective view of a planetary gear mechanism closest to the drive unit among a plurality of planetary gear mechanisms of the boring device according to the first embodiment of the present invention and shows the planetary gear mechanism as viewed in the course of assembly.

FIG. 3 is a perspective view of the planetary gear mechanism closest to the drive unit among the plurality of planetary gear mechanisms of the boring device according to the present embodiment and shows the planetary gear mechanism as viewed in the course of assembly. As shown in FIG. 3, the speed reduction mechanism 30 further includes a first circular plate 32. At the center of the first circular plate 32 is located a through hole 33 (see FIG. 2) through which the input shaft 21 extends. The edge surface of the first circular plate 32 and the major surface of the first circular plate 32 that faces toward the drive unit 13 define a part of the outer shape of the pump unit 20.

The planetary gear mechanism 31a includes a sun gear 34a located at the center of the first circular plate 32, three planetary gears 36a externally contacting the sun gear 34 to rotate in mesh with the sun gear 34a, and an internal gear 38a internally contacted by the three planetary gears 36a to rotate in mesh with the three planetary gears 36a. The diameter of the internal gear 38a is equal to the diameter of the first circular plate 32. The edge surface of the internal gear 38a defines a part of the outer shape of the pump unit 20.

The sun gear 34a projects from the outer surface of the input shaft 21 and is integrated with the outer surface of the input shaft 21. In other words, the sun gear 34a is secured to the outer surface of the input shaft 21. As such, the sun gear 34a rotates together with the input shaft 21 and is coaxial with the input shaft 21.

Figure 4:
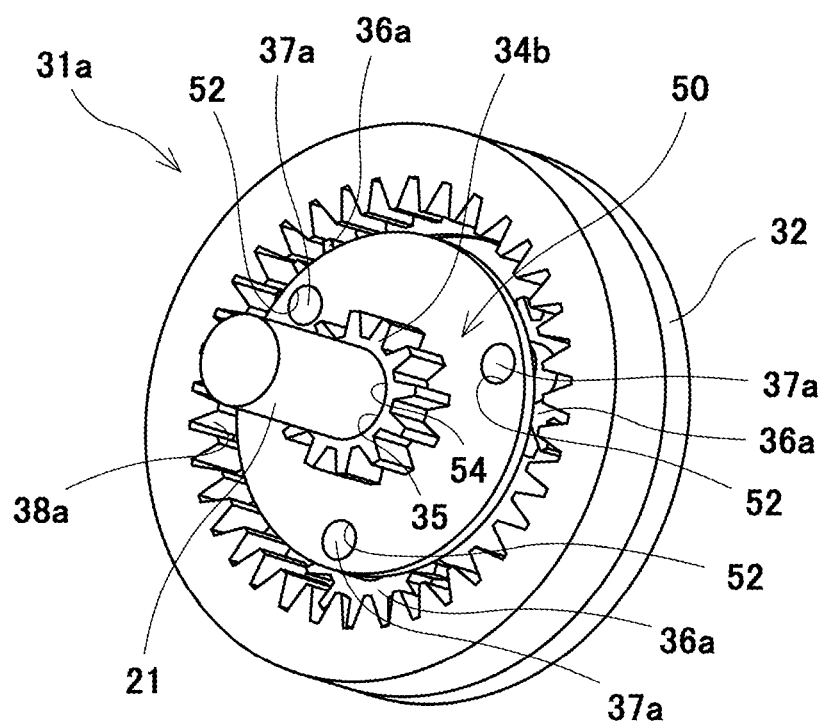
FIG. 4 is a perspective view of the planetary gear mechanism closest to the drive unit among the plurality of planetary gear mechanisms of the boring device according to the first embodiment of the present invention and shows the planetary gear mechanism with a planetary carrier attached thereto.

FIG. 4 is a perspective view of the planetary gear mechanism closest to the drive unit among the plurality of planetary gear mechanisms of the boring device according to the present embodiment and shows the planetary gear mechanism with a planetary carrier attached thereto. As shown in FIG. 4, the speed reduction mechanism 30 further includes a planetary carrier 50 shaped as a circular plate and connecting the planetary gear mechanisms 31a and 31b together.

The planetary carrier 50 includes three fitting holes 52 (fitting-receiving portions) into which respective rotational shafts 37a of the three planetary gears 36a are fitted. Thus, the planetary carrier 50 is connected to the three planetary gears 36a. The three fitting holes 52 are located near the periphery of the planetary carrier 50 and arranged at regular intervals in the circumferential direction of the planetary carrier 50. The planetary carrier 50 further includes a shaft hole 54 (second shaft hole) through which the input shaft 21 extends. The shaft hole 54 is located at the center of the planetary carrier 50.

A sun gear 34b of the planetary gear mechanism 31b is integrated with the central portion of the major surface of the planetary carrier 50 that faces toward the cutting edge 98. Thus, the planetary carrier 50 rotates together with the sun gear 34b.

Figure 5:
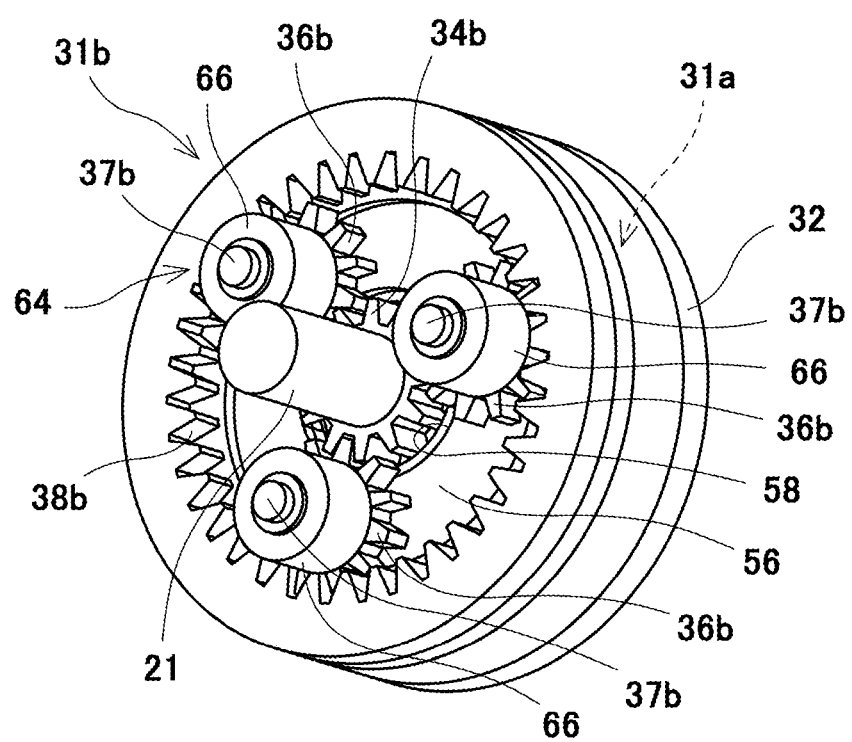
FIG. 5 is a perspective view of a planetary gear mechanism closest to a cutting edge among the plurality of planetary gear mechanisms of the boring device according to the first embodiment of the present invention and shows the planetary gear mechanism with pressers attached to a plurality of planetary gears of the planetary gear mechanism.

FIG. 5 is a perspective view of the planetary gear mechanism closest to the cutting edge among the plurality of planetary gear mechanisms of the boring device according to the present embodiment and shows the planetary gear mechanism with pressers attached to the plurality of planetary gears of the planetary gear mechanism. As shown in FIG. 5, the speed reduction mechanism 30 further includes a second circular plate 56 located closer to the cutting edge 98 than the planetary carrier 50. At the center of the second circular plate 56 is located a through hole 58 through which the input shaft 21 extends and through which the sun gear 34b passes. The diameter of the second circular plate 56 is equal to the diameter of the first circular plate 32 and internal gear 38a. The edge surface of the second circular plate 56 defines a part of the outer shape of the pump unit 20.

The planetary gear mechanism 31a includes the sun gear 34b integrated with the planetary carrier 50 as described above and further includes three planetary gears 36b externally contacting the sun gear 34b to rotate in mesh with the sun gear 34b and an internal gear 38b internally contacted by the three planetary gears 36b to rotate in mesh with the three planetary gears 36b. The sun gear 34b includes a shaft hole 35 (first shaft hole) through which the input shaft 21 extends. The shaft hole 35 communicates with the shaft hole 54 of the planetary carrier 50. The diameter of the internal gear 38b is equal to the diameter of the first circular plate 32, second circular plate 56, and internal gear 38a. The edge surface of the internal gear 38b defines a part of the outer shape of the pump unit 20.

Tube Pump 60

Figure 6:
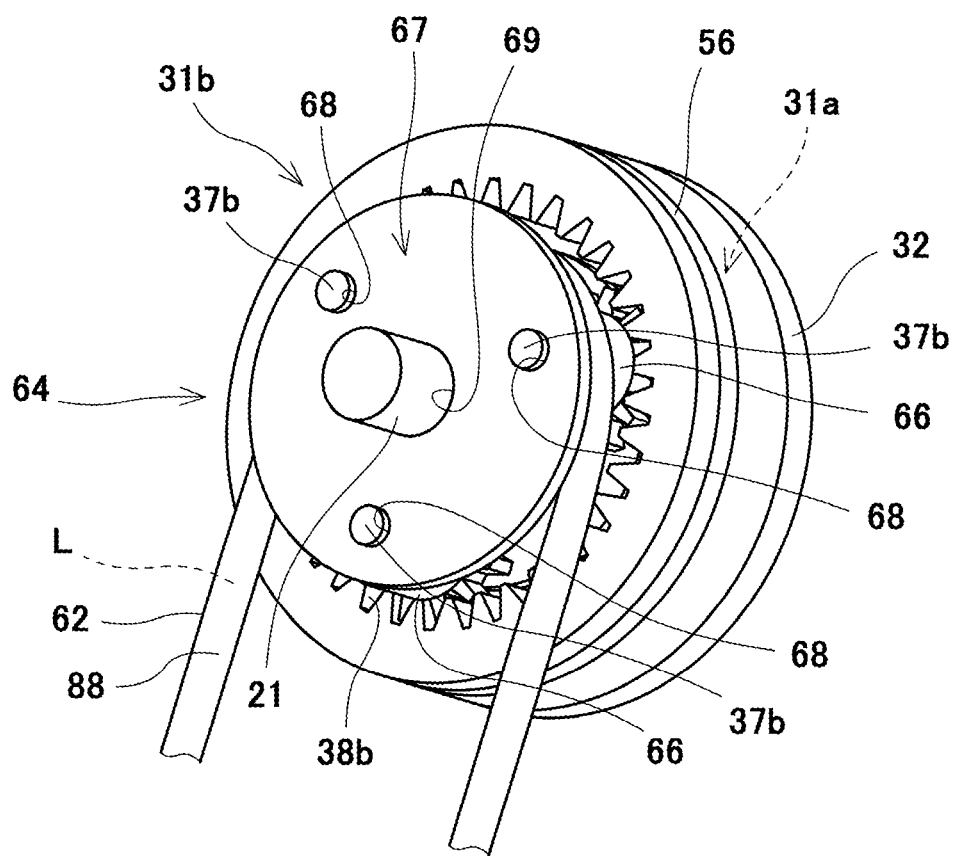
FIG. 6 is a perspective view of the planetary gear mechanism closest to the cutting edge among the plurality of planetary gear mechanisms of the boring device according to the first embodiment of the present invention and shows the planetary gear mechanism with a third circular plate and feed tube attached thereto.
Figure 7:
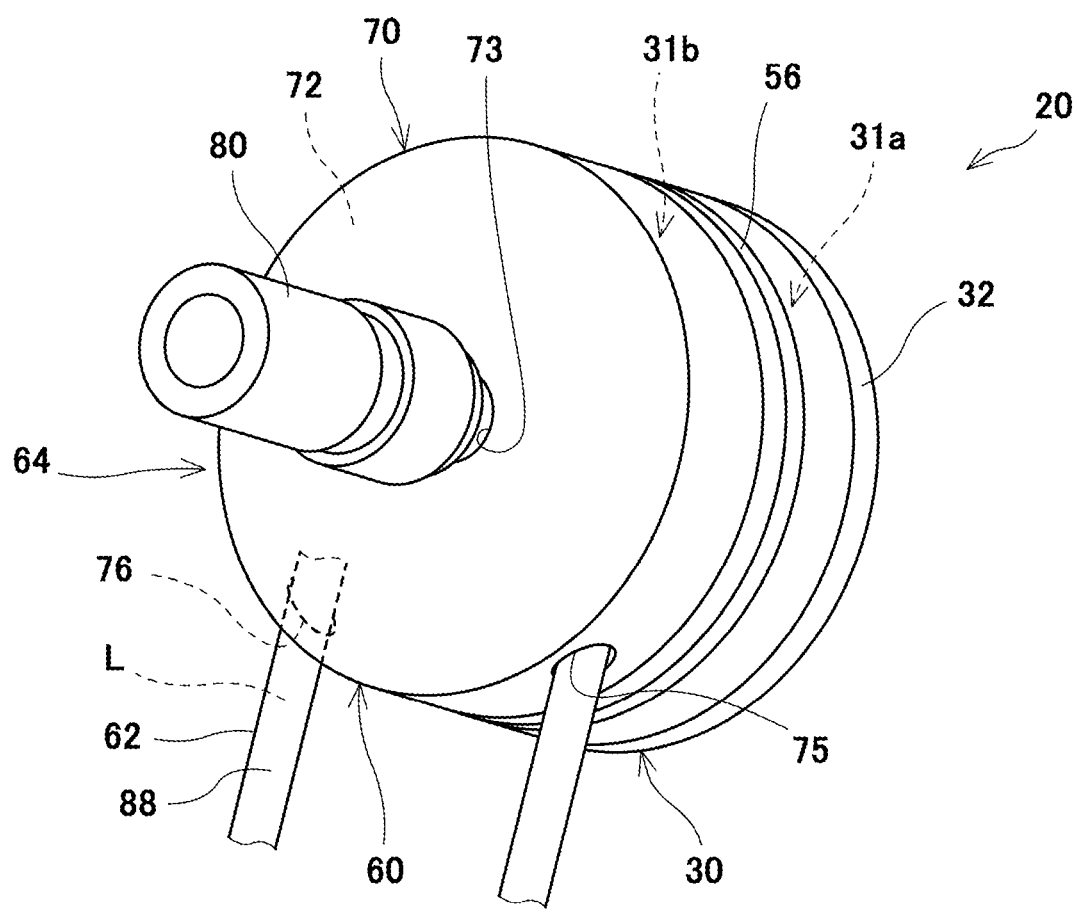
FIG. 7 is a perspective view of the pump unit of the boring device according to the first embodiment of the present invention and shows the pump unit as viewed from the cutting edge.

FIG. 6 is a perspective view of the planetary gear mechanism closest to the cutting edge among the plurality of planetary gear mechanisms of the boring device according to the present embodiment and shows the planetary gear mechanism with a third circular plate and feed tube attached thereto. FIG. 7 is a perspective view of the pump unit of the boring device and shows the pump unit as viewed from the cutting edge.

As shown in FIGS. 5 to 7, the tube pump 60 includes a feed tube 62 constituting a part of the feed flow path 88 and a first pressing mechanism 64 that presses the feed tube 62.

As shown in FIGS. 5 and 6, the first pressing mechanism 64 includes three rollers 66 (pressers) mounted on the three planetary gears 36b, respectively, and rotatable together with the three planetary gears 36b, respectively. The three rollers 66 are coaxial with the three planetary gears 36b, respectively, and mounted on the respective rotational shafts 37b of the three planetary gears 36b.

As shown in FIG. 6, the first pressing mechanism 64 further includes a third circular plate 67 located closer to the cutting edge 98 than the three rollers 66. The third circular plate 67 includes three fitting holes 68 into which the respective rotational shafts 37b of the planetary gears 36b are fitted. Thus, the third circular plate 67 is connected to the three planetary gears 36b via the three rollers 66. The three fitting holes 68 are located near the periphery of the third circular plate 67 and arranged at regular intervals in the circumferential direction of the third circular plate 67. The third circular plate 67 further includes a through hole 69 through which the input shaft 21 extends. The through hole 69 is located at the center of the third circular plate 67.

As shown in FIG. 7, the first pressing mechanism 64 further includes a cover 70 including an inner wall 72 internally contacted by the three rollers 66, with the feed tube 62 interposed between the inner wall 72 and the three rollers 66, to press the feed tube 62 in cooperation with the three rollers 66. The cover 70 is shaped as a hollow circular cylinder and coaxial with the input shaft 21. At the center of one base of the cover 70 that faces toward the cutting edge 98 is located a through hole 73 through which the input shaft 21 extends. The other base of the cover 70 which faces toward the drive unit 13 is open. The inner wall 72 is the inner wall of the circumferential surface of the cover 70. The circumferential surface of the cover 70 is provided with an insertion hole 75 through which the feed tube 62 extending from the cooling liquid tank is inserted into the cover 70 and an outlet hole 76 through which the feed tube 62 is drawn out of the cover 70 toward the cutting edge 98.

The diameter of the cover 70 is equal to the diameter of the first circular plate 32, second circular plate 56, and internal gears 38a and 38b. The base of the cover 70 that faces toward the cutting edge 98 and the circumferential surface of the cover 70 define a part of the outer shape of the pump unit 20.

Effects

In the boring device 10A according to the present embodiment, which is constructed as described above, the tube pump 60 is driven by the drive unit 13 that rotationally drives the cutting edge 98. Thus, the cooling liquid can be forced to flow to the cutting edge 98 with a simple device configuration.

The boring device 10A according to the present embodiment includes the speed reduction mechanism 30, by virtue of which the first pressing mechanism 64 can be rotated at a lower speed than the drill bit 90. This makes it possible, for example, to force the cooling liquid L in the feed flow path 88 to properly flow to the cutting edge 98 of the drill bit 90 while rotating the drill bit 90 at a sufficiently high speed, thus accomplishing a boring operation successfully.

In the present embodiment, the sun gears 34a and 34b are coaxial with the input shaft 21, and this allows for further simplification of the configuration of the boring device 10A.

In the present embodiment, the tube pump 60 is disposed outside the housing 12, and this makes it easier to attach and detach the tube pump 60 to and from the drive unit 13 (or the electric drill 11).

Second Embodiment

Figure 8:
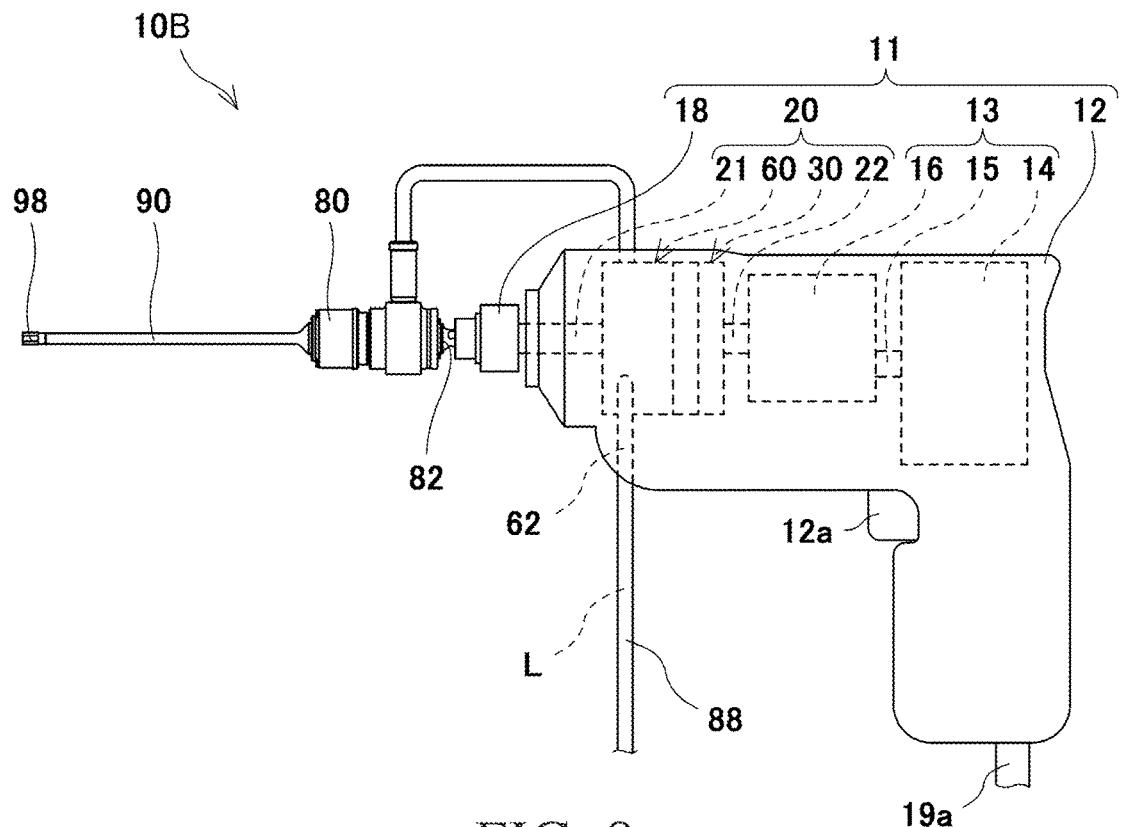
FIG. 8 is a schematic view showing the overall configuration of a boring device according to a second embodiment of the present invention.

A boring device according to a second embodiment of the present invention will be described based on FIG. 8. FIG. 8 is a schematic view showing the overall configuration of the boring device according to the present embodiment. The boring device 10B according to the present embodiment has essentially the same construction as the boring device 10A according to the first embodiment described above, except for the location of the tube pump 60. The same elements will be denoted by the same reference signs, and the same descriptions will not be repeated.

In the present embodiment, as shown in FIG. 8, the tube pump 60 is disposed inside the housing 12. Specifically, the tube pump 60 is located between the drive unit 13 disposed inside the housing 12 and the first gripping mechanism 18 disposed outside the housing 12.

In the present embodiment, the proximal end portion (i.e., the shank 22) of the input shaft 21 of the tube pump 60 is coupled to the motor speed reduction mechanism 16 inside the housing 12. Thus, the motor speed reduction mechanism 16 reduces the speed of rotation produced by power derived from the electric motor 14 and transmits the resulting power to the input shaft 21 of the pump unit 20.

In the present embodiment, a shank 82 projects from the proximal end of the second gripping mechanism 80. The shank 82 is gripped by the first gripping mechanism 18 and connected to the distal end portion of the input shaft 21 inside the first gripping mechanism 18.

In the present embodiment constructed as described above, the power derived from the electric motor 14 is transmitted to the drill bit 90. In the present embodiment, the occurrence of failure of the tube pump 60 can be reduced since the tube pump 60 is enclosed in the housing 12 and not exposed to the outside environment.

Third Embodiment

Figure 9:
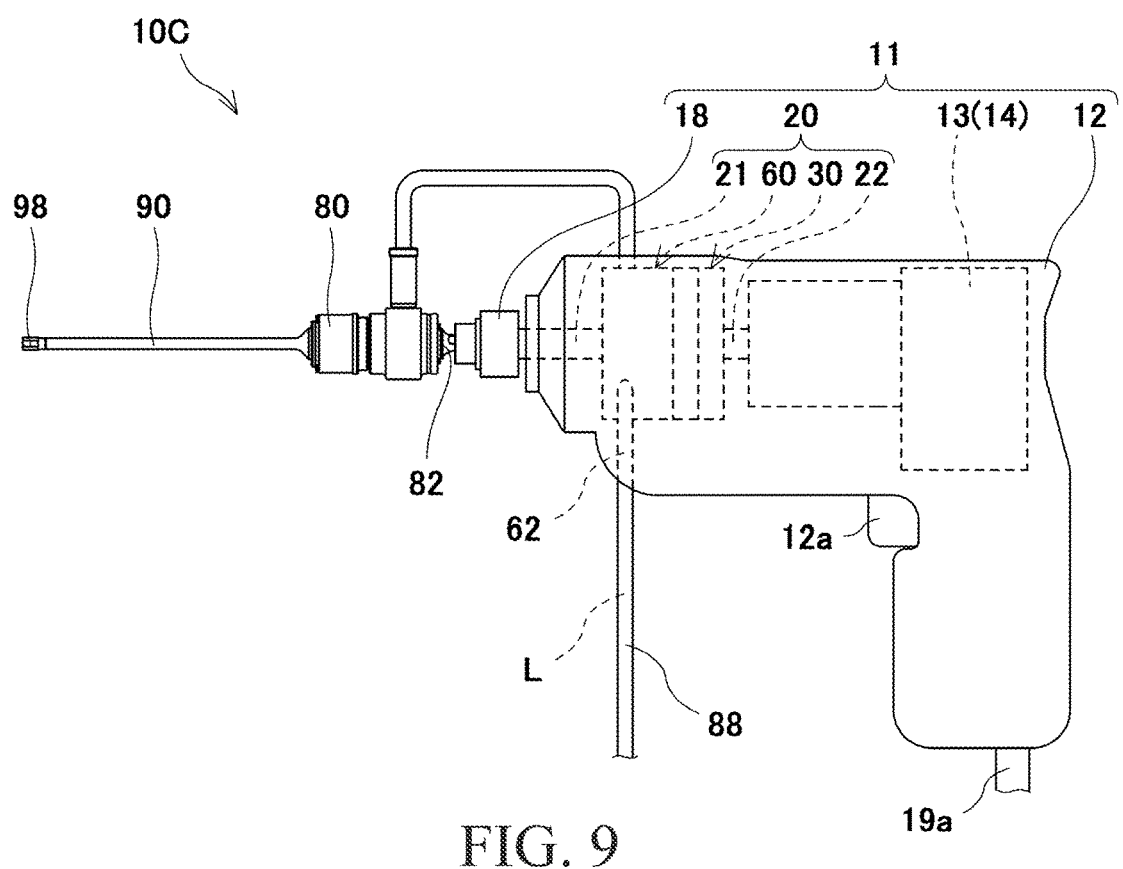
FIG. 9 is a schematic view showing the overall configuration of a boring device according to a third embodiment of the present invention.

A boring device according to a third embodiment of the present invention will be described based on FIG. 9. FIG. 9 is a schematic view showing the overall configuration of the boring device according to the present embodiment. The boring device 10C according to the present embodiment has the same construction as the boring device 10B according to the second embodiment, except that the boring device 10C is devoid of the motor speed reduction mechanism 16. The same elements will be denoted by the same reference signs, and the same descriptions will not be repeated.

As shown in FIG. 9, the boring device 10C according to the present embodiment is devoid of the motor speed reduction mechanism 16, and the drive shaft 15 of the electric motor 14 serves as the input shaft of the pump unit 20. This allows, for example, for weight reduction of the boring device 10C. In the present embodiment, the input shaft of the pump unit 20 may be provided separately from the drive shaft 15 of the electric motor 14, and the proximal end portion of the input shaft may be attached directly to the distal end portion of the drive shaft 15.

Fourth Embodiment

Figure 10:
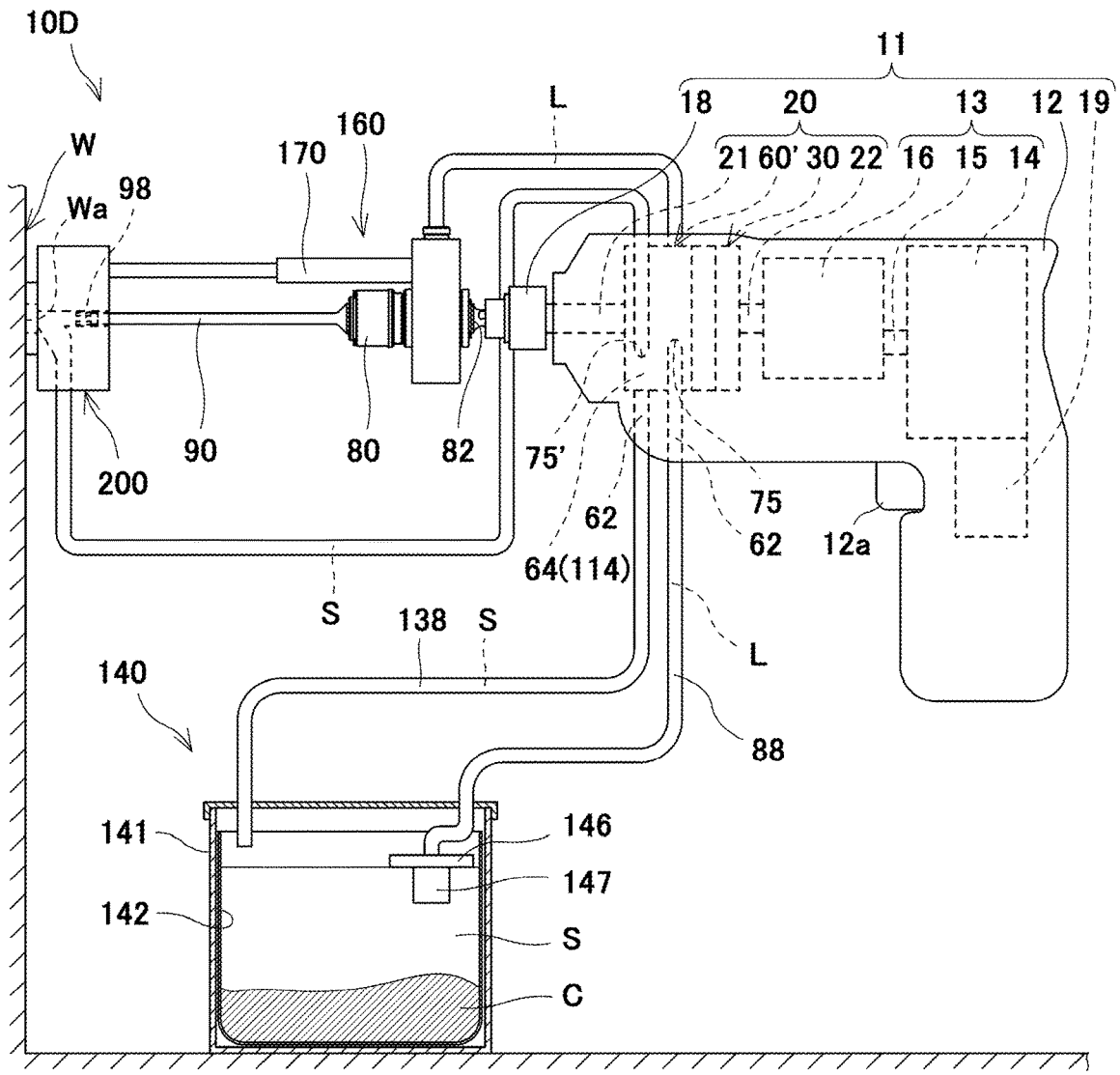
FIG. 10 is a schematic view showing the overall configuration of a boring device according to a fourth embodiment of the present invention.

A boring device according to a fourth embodiment of the present invention will be described based on FIGS. 10 to 14. FIG. 10 is a schematic view showing the overall configuration of the boring device according to the present embodiment. The construction of the boring device 10D according to the present embodiment is identical in many ways to that of the boring device 10B according to the second embodiment described above. The same elements will be denoted by the same reference signs, and the same descriptions will not be repeated.

As shown in FIG. 10, the boring device 10D according to the present embodiment further includes a discharge flow path 138 through which a suspension S is discharged from the cutting edge 98. In the present embodiment, the tube pump 60' further includes a discharge tube 112 constituting a part of the discharge flow path 138 and a second pressing mechanism 114 that presses the discharge tube 112.

The circumferential surface of the cover 70 is provided with an insertion hole 75' through which the discharge tube 112 extending from the cutting edge 98 is inserted into the cover 70, in addition to the insertion hole 75 for the feed tube 62. The circumferential surface of the cover 70 is provided with an outlet hole (not shown) through which the discharge tube 112 is drawn out of the cover 70 toward a tank 150 described later, in addition to the outlet hole 76 (not shown in FIG. 10; see FIG. 7) for the feed tube 62. The insertion hole 75' and outlet hole for the discharge tube 112 are located closer to the cutting edge 98 than the insertion hole 75 and outlet hole 76 for the feed tube 62, respectively, and are located at the same height as the insertion hole 75 and outlet hole 76, respectively.

In the present embodiment, a single pressing mechanism 64 (114) serves as both the first pressing mechanism 64 that presses the feed tube 62 and the second pressing mechanism 114 that presses the discharge tube 112. Specifically, the pressing mechanism 64 (114) of the present embodiment has the same construction as the first pressing mechanism 64 described above based on FIGS. 5 to 7. The three rollers 66 (see FIGS. 5 and 6) and the inner wall 72 (see FIG. 7) of the cover 70 press the discharge tube 112 as well as the feed tube 62. Thus, the pressing mechanism 64 (114) forces the suspension S in the discharge flow path 138 to flow downstream of the discharge flow path 138 in addition to forcing the cooling liquid L in the feed flow path 88 to flow to the cutting edge 98.

As shown in FIG. 10, the upstream end of the feed flow path 88 and the downstream end of the discharge flow path 139 are connected to a separation device 140 that separates chips C of the workpiece from the suspension S to recover the cooling liquid L.

Separation Device 140

The separation device 140 includes a liquid vessel 141 and an inner vessel 142 disposed inside the liquid vessel 141. The separation device 140 further includes a float 146 floating on the suspension S held in the inner vessel 142 and a strainer 147 that is movable in the suspension S together with the float 146 and that separates the chips C from the suspension S.

The suspension S is discharged from the downstream end of the discharge flow path 138 into the inner vessel 142, and then the chips C and other substances settle under their own weight. Additionally, the strainer 147 removes the chips C (chips C that are too large to pass between a sliding member 167 and a rotor 161 which are described later or between an incline 167a and a sealing member 165 which are also described later) in the vicinity of the liquid surface of the suspension S. Thus, the cooling liquid L recovered by separation of the chips C from the suspension S can be fed to the upstream end of the feed flow path 88 which is connected to the strainer 147.

As shown in FIG. 10, the boring device 10D according to the present embodiment further includes: a cooling liquid feed mechanism 160 located closer to the cutting edge 98 than the housing 12 and the first gripping mechanism 18; and a shield 200 that covers a boring target area Wa of a workpiece W in which a hole is bored by the cutting edge 98 of the drill bit 90. The shield 200 is biased forward by a biasing mechanism 170 described later.

Figure 11:
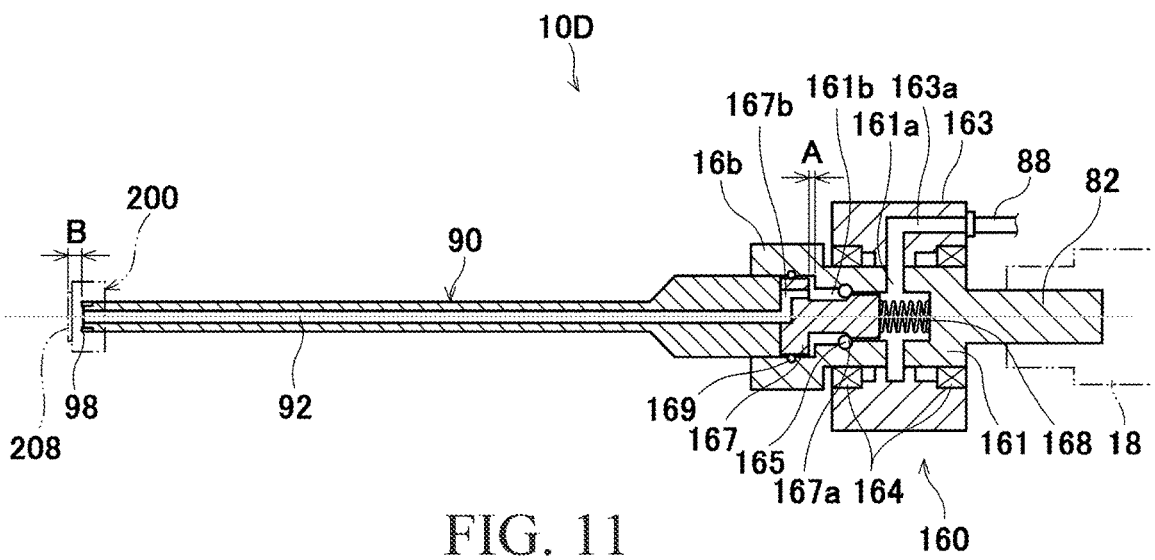
FIG. 11 is a cross-sectional view of a cooling liquid feed mechanism and its neighboring components of the boring device according to the fourth embodiment of the present invention and shows the cooling liquid feed mechanism and its neighboring components cut at the center in the width direction of the boring device along the longitudinal direction of the boring device.

FIG. 11 is a cross-sectional view of the cooling liquid feed mechanism and its neighboring components of the boring device according to the present embodiment and shows the cooling liquid feed mechanism and its neighboring components cut at the center in the width direction of the boring device along the longitudinal direction of the boring device. As shown in FIG. 11, the cooling liquid feed mechanism 160 includes: a rotor 161 including the shank 82 gripped by the first gripping mechanism 18 of the electric drill 11; and a cooling liquid feeder 163 disposed around the rotor 161. The cooling liquid feeder 163 can be kept from rotating by a bearing 164 disposed between the cooling liquid feeder 163 and the rotor 161. The feed flow path 88 is connected to the cooling liquid feeder 163. A feed flow path 163a disposed inside the cooling liquid feeder 163 communicates with a feed flow path 161a disposed inside the rotor 161.

At the front of the rotor 161 is disposed a bit retainer 166 that grips the proximal end portion of the drill bit 90. The proximal end portion of the drill bit 90 is inserted into and held by the bit retainer 166. The mechanism for holding the proximal end portion of the drill bit 90 is omitted in the drawings. Any known technical means can be used as the mechanism for holding the proximal end portion of the drill bit 90.

Inside the rotor 161 is disposed a sliding member 167 movable a predetermined distance in the front-rear direction (i.e., the longitudinal direction of the drill bit 90) while maintaining contact with the proximal end portion of the drill bit 90. The sliding member 167 is biased forward by a biasing member 168 (spring) disposed inside the rotor 161. At the rear of the sliding member 167 is disposed an incline 167a along which the diameter of the sliding member 167 increases. The biasing force of the biasing member 168 keeps the incline 167a in contact with a sealing member 165 disposed at a given location on the rotor 161. The front portion of the sliding member 167 is sealed by a sealing member 169 disposed between the front portion of the sliding member 167 and the bit retainer 166. O-rings can be used as the sealing members 165 and 169. The sliding member 167 is slidable rearward against the biasing force of the biasing member 168 within a given size of gap A provided between the sliding member 167 and the rotor 161.

A space 161b between the sliding member 167 and the rotor 161 communicates with a cooling liquid feed hole 92 of the drill bit 90 via a feed flow path 167b of the sliding member 167. The cooling liquid feed hole 92 extends from the proximal end portion of the drill bit 90 to the cutting edge 98.

As shown in FIG. 11, in the state where the sliding member 167 is biased forward by the biasing member 168, the incline 167a is in contact with the sealing member 165, and the feed flow path 161a and the space 161b are disconnected from each other. In this state, the cooling liquid L fed from the feed flow path 88 to the cooling liquid feeder 163 does not flow from the feed flow path 161a to the space 161b.

Once the sliding member 167 is pushed from the direction of the drill bit 90 (the state shown in FIG. 14B described later), the sliding member 167 moves rearward against the biasing force of the biasing member 168 within the gap A of given size. In this state, the incline 167a is away from the sealing member 165, and the feed flow path 161a and the space 161b are connected, so that the cooling liquid L fed from the feed flow path 88 flows from the feed flow path 161a to the space 161b.

With the drill bit 90 attached to the bit retainer 166, the cooling liquid L is fed to and stopped in the cooling liquid feed mechanism 160. Once the drill bit 90 is pushed rearward, the cooling liquid L in the cooling liquid feed mechanism 160 is delivered to the cutting edge 98 through the cooling liquid feed hole 92 of the drill bit 90 and fed from the cutting edge 98 to the boring target area Wa.

In other words, the boring device 10D according to the present embodiment further includes: a sliding member 167 mounted on the proximal end of the drill bit 90 and slidable together with the drill bit 90 in the longitudinal direction of the drill bit 90; and a biasing member 168 that biases the drill bit 90 and the sliding member 167 in the direction from the proximal end of the drill bit 90 toward the cutting edge 98. The sliding member 167 closes the feed flow path 88 when placed toward the cutting edge 98 by the biasing force of the biasing member 168, and opens the feed flow path 88 when slid proximally against the biasing force of the biasing member 168.

In this embodiment, the gap A of given size, within which the sliding member 167 moves in the front-rear direction, is smaller than a gap B (see FIGS. 11 and 14B) provided between the front surface of the shield 200 biased forward by the biasing mechanism 170 described later and the cutting edge 98 of the drill bit 90. Thus, the incline 167a of the sliding member 167 moves away from the sealing member 165 after the front surface of the shield 200 is first brought into contact with the workpiece W and then the drill bit 90 is pushed in the gap B by a distance corresponding to the size of the gap A. This allows a sealing member 208 of the shield 200 to be pressed against the workpiece W while the cooling liquid L is fed from the cutting edge 98 (see FIG. 14B), thus preventing leakage of the cooling liquid L from a space between the shield 200 and the workpiece W. The above-described relationship between the gaps A and B is merely an example, and the relationship between the gaps A and B is not limited to that in this embodiment.

Shield 200

Figure 12A:
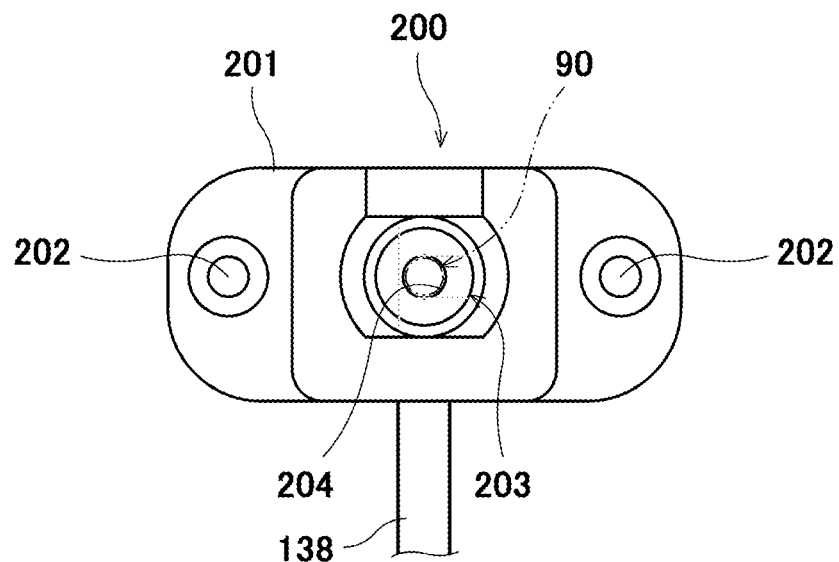
FIGS. 12A and 12B are each a schematic view of a shield of the boring device according to the fourth embodiment of the present invention.
Figure 12B:
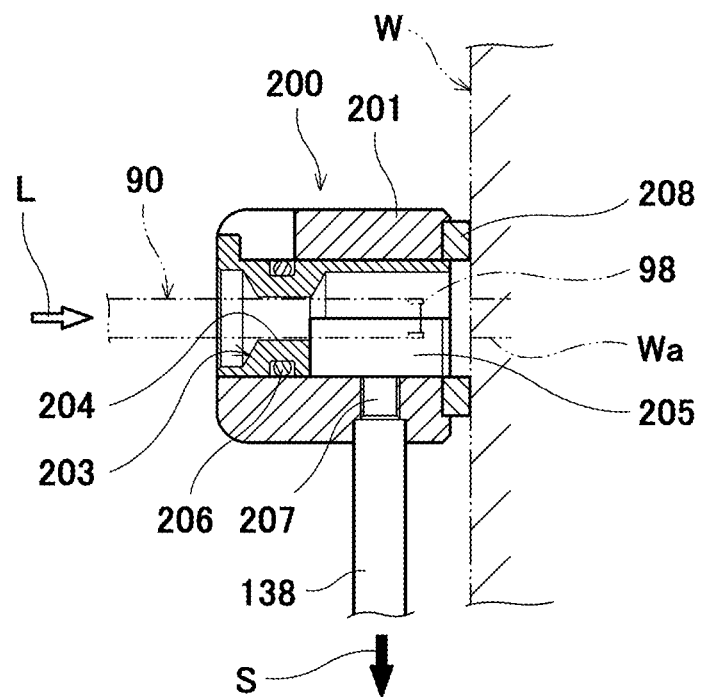
Figure 13:
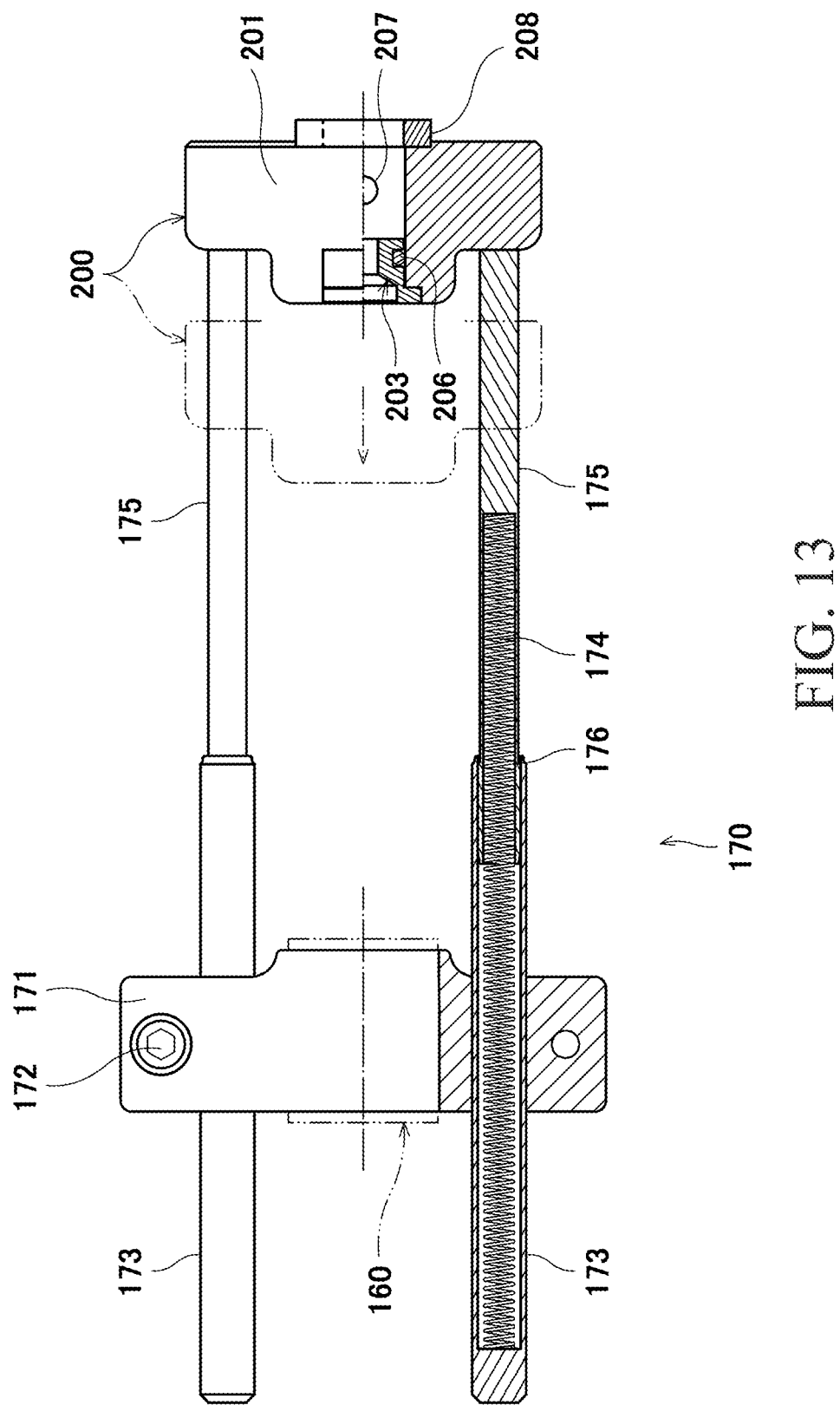
FIG. 13 is a schematic view showing a biasing mechanism of the boring device according to the fourth embodiment of the present invention.

FIGS. 12A and 12B are each a schematic view of the shield of the boring device according to the present embodiment. FIG. 12A is a schematic view of the shield as viewed from the proximal end of the drill bit, and FIG. 12B is a cross-sectional view of the shield cut at the center in the width direction of the boring device along the longitudinal direction of the boring device. The shield 200 of this embodiment includes a horizontally-long main body 201 and couplers 202 disposed at the two longitudinal ends of the main body 201. Sliders 175 of the biasing mechanism 170 shown in FIG. 13 are coupled to the couplers 202. At the center of the main body 201 is disposed a guide member 203 that guides the front portion of the drill bit 90 in the front-rear direction. A guide 204 for the drill bit 90 is disposed at the center of the guide member 203, and a cavity 205 is disposed in the front portion of the guide member 203. A sealing member 206 is disposed between the guide member 203 and the main body 201 to prevent leakage of the suspension S from a space between the guide member 203 and the main body 201. An O-ring can be used as the sealing member 206.

At the front surface of the main body 201 is disposed the sealing member 208 that makes contact with the workpiece W. The sealing member 208 seals the periphery of the cavity 205 and further seals the periphery of the boring target area Wa. A sponge or rubber material can be used as the sealing member 208.

At the lower portion of the main body 201 is located a discharge hole 207 leading from the cavity 205 to the exterior of the main body 201. The discharge flow path 138 is connected to the discharge hole 207. The suspension S in the cavity 205 is discharged into the discharge flow path 138 through the discharge hole 207.

Biasing Mechanism 170

FIG. 13 is a schematic view showing a biasing mechanism of the boring device according to the fourth embodiment of the present invention. FIG. 13 is a half-sectional view. The biasing mechanism 170 of this embodiment includes a main body 171 mounted on the cooling liquid feed mechanism 160 of the boring device 10D. The main body 171 is secured to the outer surface of the cooling liquid feed mechanism 160.

The main body 171 is provided with two guides 173 extending in the front-rear direction and two sliders 175 slidable along the guides 173 in the front-rear direction, the guides 173 and sliders 175 being located to the left and right of the cooling liquid feed mechanism 160. The guides 173 are inserted into holes of the main body 171 and fastened at opposite left and right points by fastening bolts 172, thus being secured to the main body 171. The sliders 175 are biased forward by biasing springs 174 disposed inside the guides 173. The forward sliding of the sliders 175 is prevented by holders 176 disposed at the front end portions of the guides 173, and the sliders 175 are held at given positions as shown in FIG. 13. The sliders 175 are slidable rearward from the shown positions against the biasing forces of the biasing springs 174.

The shield 200 is secured to the front ends of the sliders 175. Thus, the shield 200 is movable rearward together with the sliders 175 against the biasing forces of the biasing springs 174.

Example of Boring Operation

Figure 14A:
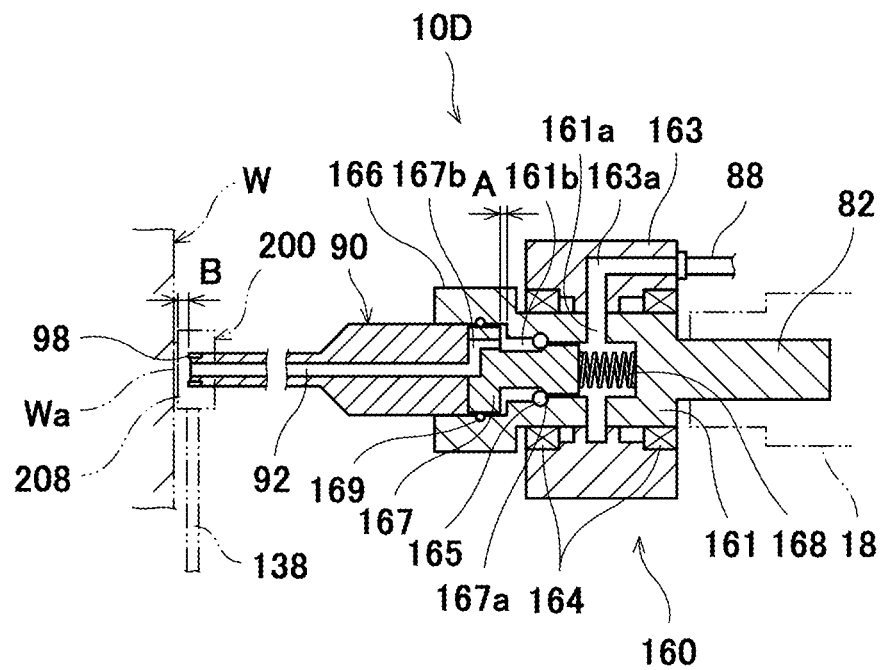
FIGS. 14A and 14B are each a cross-sectional view of the cooling liquid feed mechanism and its neighboring components of the boring device according to the fourth embodiment of the present invention and show the cooling liquid feed mechanism and its neighboring components cut at the center in the width direction of the boring device along the longitudinal direction of the boring device.
Figure 14B:
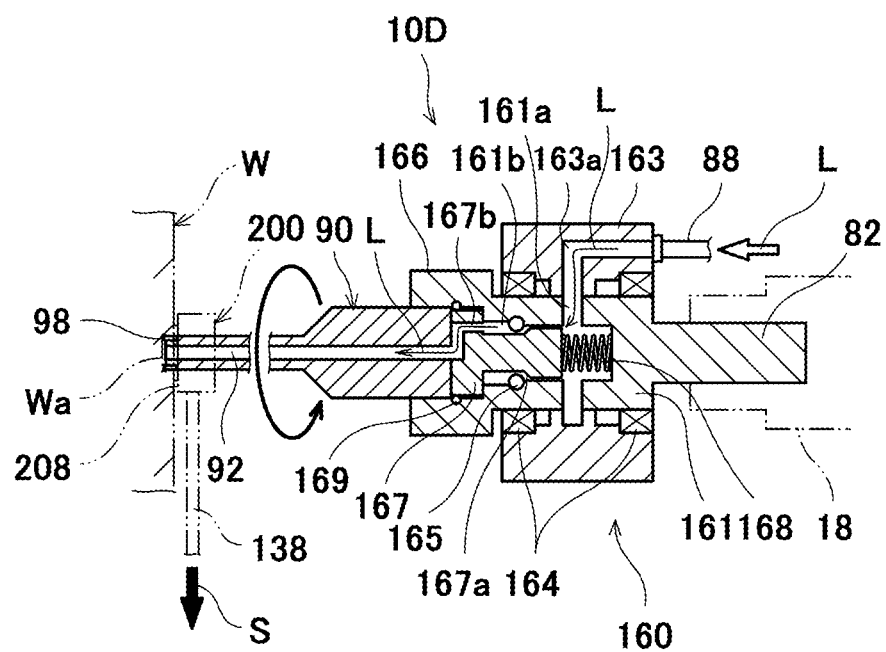

FIGS. 14A and 14B are each a cross-sectional view of the cooling liquid feed mechanism and its neighboring components of the boring device according to the present embodiment and show the cooling liquid feed mechanism and its neighboring components cut at the center in the width direction of the boring device along the longitudinal direction of the boring device. FIG. 14A is a cross-sectional view of the cooling liquid feed mechanism and its neighboring components in a state with the feed flow path closed before a boring operation, and FIG. 14B is a cross-sectional view of the cooling liquid feed mechanism and its neighboring components in a state with the feed flow path open during the boring operation. An exemplary boring operation performed on the workpiece W using the boring device 10D and separation device 140 will be described based on FIGS. 10 and 14.

First, as shown in FIG. 10, the boring device 10D is connected to the separation device 140 via the feed flow path 88 and the discharge flow path 138. The pump unit 20' and drill bit 90 are driven by the drive unit 13, and the cutting edge 98 of the boring device 10D is placed on the boring target area Wa of the workpiece W. In this state, the tube pump 60' presses the feed tube 62 in an attempt to feed the cooling liquid L from the liquid vessel 141 to the cutting edge 98 of the drill bit 90. However, as shown in FIG. 14A, the sliding member 167 of the cooling liquid feed mechanism 160 is in contact with the sealing member 165 and closes the end of the feed flow path 161a, and thus the cooling liquid L is not fed from the liquid vessel 141. The tube pump 60' presses the discharge tube 112, and this leads to a state where air has been sucked into the discharge flow path 138 from the cavity 205 (FIG. 12B) of the shield 200. In this state, the sealing member 208 of the shield 200 of the boring device 10D is placed against the boring target area Wa of the workpiece W.

Subsequently, as shown in FIG. 14B, an operation interface 12a disposed on the housing 12 is operated to rotate the drill bit 90, and the cutting edge 98 of the rotating drill bit 90 is pressed against the workpiece W. This leads to the shield 200 being pressed against the workpiece W with a suitable force by the biasing mechanism 170. As a result of the cutting edge 98 of the drill bit 90 being pressed against the workpiece W, the proximal end portion of the drill bit 90 causes the sliding member 167 to move rearward against the biasing force of the biasing member 168 within the gap A of given size.

Thus, the incline 167a of the sliding member 167 moves away from the sealing member 165, and the feed flow path 163a of the cooling liquid feeder 163 is connected to the cooling liquid feed hole 92 of the drill bit 90 through the feed flow path 161a and space 161b of the rotor 161 and the feed flow path 167b of the sliding member 167. As such, the cooling liquid L delivered from the liquid vessel 141 to the cooling liquid feed mechanism 160 is fed from the cutting edge 98 of the drill bit 90 to the boring target area Wa while a hole is being bored in the workpiece W by the cutting edge 98 of the drill bit 90. The suspension S in the cavity 205 (see FIG. 12B) of the shield 200 is forcibly discharged into the liquid vessel 141 as a result of the discharge tube 112 being pressed by the pressing mechanism 64 (114) (see FIG. 10).

As described above, the cutting edge 98 of the rotating drill bit 90 is pressed against the workpiece W located ahead of the cutting edge 98, and a hole is bored in the boring target area Wa of the workpiece W by the cutting edge 98. During this boring operation, the feed tube 62 is pressed by the pressing mechanism 64 (114), and accordingly the cooling liquid L in the liquid vessel 141 is forcibly delivered to the cutting edge 98 of the boring device 10D and fed from the cutting edge 98 to the boring target area Wa. At the same time, the discharge tube 112 is pressed by the pressing mechanism 64 (114), and accordingly the suspension S is forcibly discharged out of the shield 200 into the liquid vessel 141.

Once the suspension S is discharged into the liquid vessel 141, the chips C and other substances settle under their own weight. Additionally, the strainer 147 floating in the vicinity of the liquid surface removes the chips C. Thus, the cooling liquid L is recovered and fed to the cutting edge 98 again. That is, when the cooling liquid L to be fed to the cutting edge 98 of the drill bit 90 attached to the boring device 10D is recovered from the suspension S held in the liquid vessel 141, the subsurface portion of the suspension S, which contains a smaller amount of chips C than the rest of the suspension S, is passed through the strainer 147. As such, the cooling liquid L little contaminated by the chips C is circulated to the cutting edge 98 of the boring device 10D. Furthermore, the use of the tube pump 60' allows for proper circulation of the cooling liquid L even if the cooling liquid L is somewhat contaminated by the chips C.

Thus, with the use of the boring device 10D described above, cooling liquid circulation with reliable backflow prevention can be accomplished by combination of proper feed of the cooling liquid L to the cutting edge 98 and forcible discharge of the suspension S, and at the same time a proper boring operation can be performed on the workpiece W.

Additionally, since the boring device 10D described above forcibly discharges the suspension S out of the shield 200 covering the boring target area Wa, the cooling liquid L can be circulated properly even in a boring operation during which the cutting edge is oriented downward. Boring operations with varying orientations of the cutting edge can be performed properly.

In the present embodiment, a cart for carrying the separation device 140 may be employed. This allows for easy transfer of the entire system. The transfer of the entire system can be easily accomplished using a backpack or shoulder bag instead of the cart. In the case where the electric drill 11 is equipped with an internal battery 19 as shown in FIG. 10, the system can be easily transferred with the separation device 140 placed on the cart. This makes it easier to change the site where a boring operation is to be performed. Additionally, the boring operation can be properly performed even if the workplace is relatively narrow. The electric drill 11 of the boring device 10D is not limited to being equipped with the internal battery 19. The electric drill 11 may be supplied with electric power through a power cord 19a, like the previously-described boring devices 10A to 10C (see FIGS. 1, 8, and 9).

Variants

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the gist of the present invention.

In the first to fourth embodiments described above, the speed reduction mechanism 30 includes the two planetary gear mechanisms 31a and 31b aligned in the axial direction of the input shaft 21. This is not limiting and, for example, the speed reduction mechanism 30 may include three or more planetary gear mechanisms aligned in the axial direction of the input shaft 21.

In this case, each of the three or more planetary gear mechanisms may, like the planetary gear mechanisms 31a and 31b, include a sun gear, three planetary gears, and an internal gear. In this case, the planetary carrier is disposed between each pair of adjacent planetary gear mechanisms of the three or more planetary gear mechanisms. The planetary carrier is connected to the plurality of planetary gears of one of the adjacent planetary gear mechanisms that is closer to the drive unit, and rotates together with the sun gear of the other of the adjacent planetary gear mechanisms that is closer to the cutting edge.

In the first to fourth embodiments described above, the sun gear 34a projects from, and is integrated with, the outer surface of the input shaft 21. This is not limiting and, for example, the sun gear of the planetary gear mechanism closest to the drive unit among the plurality of planetary gear mechanisms need not be integrated with the outer surface of the input shaft. In this case, for example, the sun gear may include a shaft hole, and the inner wall of the shaft hole may be secured to the outer surface of the input shaft to secure the sun gear to the outer surface of the input shaft.

In the first to fourth embodiments described above, the planetary gear mechanism 31a includes the three planetary gears 36a, and the planetary gear mechanism 31b includes the three planetary gears 36b. This is not limiting and, for example, each of the plurality of planetary gear mechanisms may include two planetary gears or four or more planetary gears. Each of the plurality of planetary gear mechanisms may include a different number of planetary gears.

In the first to fourth embodiments described above, the sun gears 34a and 34b are coaxial with the input shaft 21. This is not limiting and, for example, appropriate addition of another gear can eliminate the need for the sun gears to be coaxial with the input shaft.

In the first to fourth embodiments described above, the planetary carrier 50 includes the three fitting holes 52 (fitting-receiving portions) into which the respective rotational shafts 37a of the three planetary gears 36a are fitted. This is not limiting and, for example, the planetary carrier may include recesses serving as the fitting-receiving portions into which the respective rotational shafts of the plurality of planetary gears are fitted.

In the first to fourth embodiments described above, the speed reduction mechanism 30 includes the two planetary gear mechanisms 31a and 31b aligned in the axial direction of the input shaft 21. This is not limiting and, for example, the speed reduction mechanism may be constructed as Harmonic Drive (registered trademark).

In the above case, the first pressing mechanism may include: a rotational plate (or rotor) mounted on the input shaft of Harmonic Drive (registered trademark) to be rotatable in a plane perpendicular to the input shaft; and at least one presser disposed on the periphery of the rotational plate (or rotor). The first pressing mechanism may further include a cover including an inner wall internally contacted by the at least one presser, with the feed tube (and discharge tube) interposed between the inner wall and the at least one presser, to press the feed tube (and discharge tube) in cooperation with the at least one presser. The tube pump thus constructed can also force the cooling liquid in the feed flow path to flow to the cutting edge (and force the suspension S in the discharge flow path to flow downstream of the discharge flow path).

In the fourth embodiment described above, a single pressing mechanism 64 (114) serves as both the first pressing mechanism 64 that presses the feed tube 62 and the second pressing mechanism 114 that presses the discharge tube 112, and the feed tube 62 and discharge tube 112 are pressed by the same three rollers 66 (see FIGS. 5 and 6). This is not limiting and, for example, the first and second pressing mechanisms may be constructed separately, and the discharge tube may be pressed by pressers disposed separately from pressers that press the feed tube.

Summary

In order to solve the problem previously described, a boring device according to one embodiment of the present invention includes: a cutting edge; a drive unit that rotationally drives the cutting edge; a feed flow path through which a cooling liquid is fed to the cutting edge; and a tube pump that forces the cooling liquid in the feed flow path to flow to the cutting edge, wherein the tube pump includes a feed tube constituting a part of the feed flow path and a first pressing mechanism that presses the feed tube, and the first pressing mechanism is driven by the drive unit.

With the above features, the tube pump is driven by the drive unit that rotationally drives the cutting edge. Thus, the cooling liquid can be forced to flow to the cutting edge with a simple device configuration.

The boring device may further include a speed reduction mechanism disposed between the drive unit and the first pressing mechanism to reduce the speed of rotation produced by power derived from the drive unit and transmit the resulting power to the first pressing mechanism.

With the above features, the first pressing mechanism can be rotated at a lower speed than the cutting edge. This makes it possible to accomplish a boring operation successfully.

For example, the boring device may further include an input shaft through which the power derived from the drive unit is input to the speed reduction mechanism. The input shaft may extend from the drive unit and penetrate at least the speed reduction mechanism toward the cutting edge, and the speed reduction mechanism may include a plurality of planetary gear mechanisms aligned in an axial direction of the input shaft and a planetary carrier connecting a pair of adjacent planetary gear mechanisms of the plurality of planetary gear mechanisms. Each of the plurality of planetary gear mechanisms may include a sun gear, a plurality of planetary gears externally contacting the sun gear to rotate in mesh with the sun gear, and an internal gear internally contacted by the plurality of planetary gears to rotate in mesh with the plurality of planetary gears. The sun gear of the planetary gear mechanism closest to the drive unit among the plurality of planetary gear mechanisms may rotate together with the input shaft, and the planetary carrier may be connected to the plurality of planetary gears of one of the adjacent planetary gear mechanisms that is closer to the drive unit, and rotate together with the sun gear of the other of the adjacent planetary gear mechanisms that is closer to the cutting edge. The first pressing mechanism may include: a plurality of pressers mounted respectively on the plurality of planetary gears of the planetary gear mechanism closest to the cutting edge among the plurality of planetary gear mechanisms, the pressers being rotatable together with the plurality of planetary gears, respectively; and a cover including an inner wall internally contacted by the plurality of pressers, with the feed tube interposed between the inner wall and the plurality of pressers, to press the feed tube in cooperation with the plurality of pressers.

The sun gears of the plurality of planetary gear mechanisms may be coaxial with the input shaft, the sun gear of the planetary gear mechanism closest to the drive unit among the plurality of planetary gear mechanisms may be secured to the input shaft, and each of the sun gears of the planetary gear mechanisms other than the planetary gear mechanism closest to the drive unit may include a first shaft hole through which the input shaft extends.

With the above features, the configuration of the boring device can be further simplified.

The planetary carrier may include: a plurality of fitting-receiving portions into which are fitted respective rotational shafts of the plurality of planetary gears of one of the adjacent planetary gear mechanisms that is closer to the drive unit; and a second shaft hole through which the input shaft extends.

For example, the boring device may further include a housing enclosing at least the drive unit.

The tube pump may be disposed outside the housing.

With the above feature, the tube pump can be easily attached to and detached from the drive unit.

The tube pump may be enclosed in the housing.

With the above feature, the occurrence of failure of the tube pump can be reduced since the tube pump is not exposed to the outside environment.

The cutting edge may be a distal end of a drill bit, and the boring device may further include: the drill bit; a sliding member mounted on a proximal end of the drill bit and slidable together with the drill bit in a longitudinal direction of the drill bit; and a biasing member that biases the drill bit and the sliding member in a direction from the proximal end of the drill bit toward the cutting edge. The sliding member may close the feed flow path when placed toward the cutting edge by a biasing force of the biasing member and open the feed flow path when slid proximally against the biasing force of the biasing member.

With the above features, when the cutting edge is pressed against a workpiece in a boring operation, the sliding member slides proximally against the biasing force of the biasing member to open the feed flow path. Thus, the boring operation can be performed efficiently.

The boring device may further include a discharge flow path through which a suspension is discharged from the cutting edge, and the tube pump may further include: a discharge tube constituting a part of the discharge flow path; and a second pressing mechanism that presses the discharge tube. The second pressing mechanism may be driven by the drive unit to force the suspension in the discharge flow path to flow downstream of the discharge flow path.

With the above features, the suspension can be forcibly discharged downstream of the discharge flow path from the cutting edge. Thus, the suspension can be reliably discharged downstream of the discharge flow path even in the case where the boring target area of the workpiece is located at a lower height than the downstream end of the discharge flow path or where the boring operation is performed with the cutting edge oriented downward.

A single pressing mechanism may serve as both the first and second pressing mechanisms, and the single pressing mechanism may press the feed tube and the discharge tube to force the cooling liquid in the feed flow path to flow to the cutting edge and force the suspension in the discharge flow path to flow downstream of the discharge flow path.

With the above features, feed of the cooling liquid to the cutting edge and discharge of the suspension from the cutting edge can be efficiently achieved with a simple construction.

An upstream end of the feed flow path and a downstream end of the discharge flow path may be connected to a separation device that separates chips of a workpiece from the suspension to recover the cooling liquid.

With the above feature, the cooling liquid can be circulated. Thus, boring operations can be performed repeatedly without having to prepare a new cooling liquid for each operation.

REFERENCE CHARACTERS LIST 10A to 10D boring device
11 electric drill
12 housing
13 drive unit
14 electric motor
15 drive shaft
16 motor speed reduction mechanism
18 first gripping mechanism
20 pump unit
21 input shaft
22, 82 shank
30 speed reduction mechanism
31a, 31b planetary gear mechanism
32 first circular plate
33, 58, 69, 73 through hole
34a, 34b sun gear
35, 54 shaft hole
36a, 36b planetary gear
37a, 37b rotational shaft
38a, 38b internal gear
50 planetary carrier
52, 68 fitting hole 56 second circular plate
60, 60' tube pump
62 feed tube
64 first pressing mechanism
66 roller (presser)
67 third circular plate
70 cover
72 inner wall
75, 75' insertion hole
76 outlet hole
80 second gripping mechanism
88 feed flow path
90 drill bit
92 cooling liquid feed hole
98 cutting edge
112 discharge tube
114 second pressing mechanism
138 discharge flow path
140 separation device
160 cooling liquid feed mechanism
167 sliding member
168 biasing member
L cooling liquid
S suspension
W workpiece

The invention claimed is:

1. A boring device comprising:
a cutting edge;
a drive unit that rotationally drives the cutting edge;
a feed flow path through which a cooling liquid is fed to the cutting edge; and
a tube pump that forces the cooling liquid in the feed flow path to flow to the cutting edge, wherein
the tube pump includes a feed tube constituting a part of the feed flow path and a first pressing mechanism that presses the feed tube, and
the first pressing mechanism is driven by the drive unit.

2. The boring device according to claim 1, further comprising a speed reduction mechanism disposed between the drive unit and the first pressing mechanism to reduce the speed of rotation produced by power derived from the drive unit and transmit the resulting power to the first pressing mechanism.

3. The boring device according to claim 2, further comprising an input shaft through which the power derived from the drive unit is input to the speed reduction mechanism, wherein
the input shaft extends from the drive unit and penetrates at least the speed reduction mechanism toward the cutting edge,
the speed reduction mechanism includes a plurality of planetary gear mechanisms aligned in an axial direction of the input shaft and a planetary carrier connecting a pair of adjacent planetary gear mechanisms of the plurality of planetary gear mechanisms,
each of the plurality of planetary gear mechanisms includes a sun gear, a plurality of planetary gears externally contacting the sun gear to rotate in mesh with the sun gear, and an internal gear internally contacted by the plurality of planetary gears to rotate in mesh with the plurality of planetary gears,
the sun gear of the planetary gear mechanism closest to the drive unit among the plurality of planetary gear mechanisms rotates together with the input shaft,
the planetary carrier is connected to the plurality of planetary gears of one of the adjacent planetary gear mechanisms that is closer to the drive unit, and rotates together with the sun gear of the other of the adjacent planetary gear mechanisms that is closer to the cutting edge, and
the first pressing mechanism includes:
a plurality of pressers mounted respectively on the plurality of planetary gears of the planetary gear mechanism closest to the cutting edge among the plurality of planetary gear mechanisms, the pressers being rotatable together with the plurality of planetary gears, respectively; and
a cover including an inner wall internally contacted by the plurality of pressers, with the feed tube interposed between the inner wall and the plurality of pressers, to press the feed tube in cooperation with the plurality of pressers.

4. The boring device according to claim 3, wherein
the sun gears of the plurality of planetary gear mechanisms are coaxial with the input shaft,
the sun gear of the planetary gear mechanism closest to the drive unit among the plurality of planetary gear mechanisms is secured to the input shaft, and
each of the sun gears of the planetary gear mechanisms other than the planetary gear mechanism closest to the drive unit includes a first shaft hole through which the input shaft extends.

5. The boring device according to claim 3, wherein the planetary carrier includes: a plurality of fitting-receiving portions into which are fitted respective rotational shafts of the plurality of planetary gears of one of the adjacent planetary gear mechanisms that is closer to the drive unit; and a second shaft hole through which the input shaft extends.

6. The boring device according to claim 1, further comprising a housing enclosing at least the drive unit.

7. The boring device according to claim 6, wherein the tube pump is disposed outside the housing.

8. The boring device according to claim 6, wherein the tube pump is enclosed in the housing.

9. The boring device according to claim 1, wherein
the cutting edge is a distal end of a drill bit,
the boring device further comprises:
the drill bit;
a sliding member mounted on a proximal end of the drill bit and slidable together with the drill bit in a longitudinal direction of the drill bit; and
a biasing member that biases the drill bit and the sliding member in a direction from the proximal end of the drill bit toward the cutting edge, and
the sliding member closes the feed flow path when placed toward the cutting edge by a biasing force of the biasing member and opens the feed flow path when slid proximally against the biasing force of the biasing member.

10. The boring device according to claim 1, further comprising a discharge flow path through which a suspension is discharged from the cutting edge, wherein
the tube pump further includes:
a discharge tube constituting a part of the discharge flow path; and
a second pressing mechanism that presses the discharge tube, and
the second pressing mechanism is driven by the drive unit to force the suspension in the discharge flow path to flow downstream of the discharge flow path.

11. The boring device according to claim 10, wherein
a single pressing mechanism serves as both the first and second pressing mechanisms, and the single pressing mechanism presses the feed tube and the discharge tube to force the cooling liquid in the feed flow path to flow to the cutting edge and force the suspension in the discharge flow path to flow downstream of the discharge flow path.

12. The boring device according to claim 11, wherein an upstream end of the feed flow path and a downstream end of the discharge flow path are connected to a separation device that separates chips of a workpiece from the suspension to recover the cooling liquid.

* * * * *